UNITED STATES PATENT OFFICE.

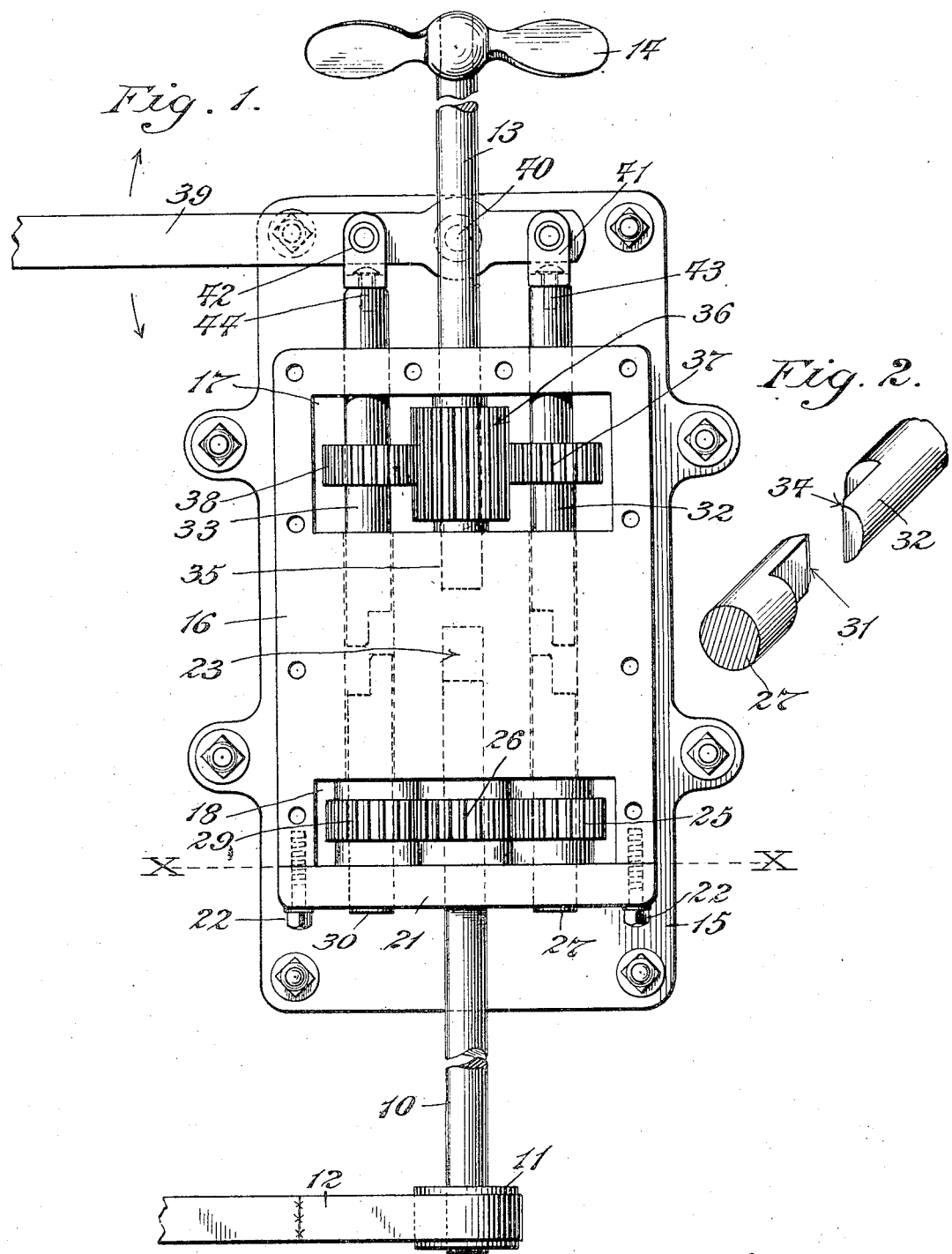

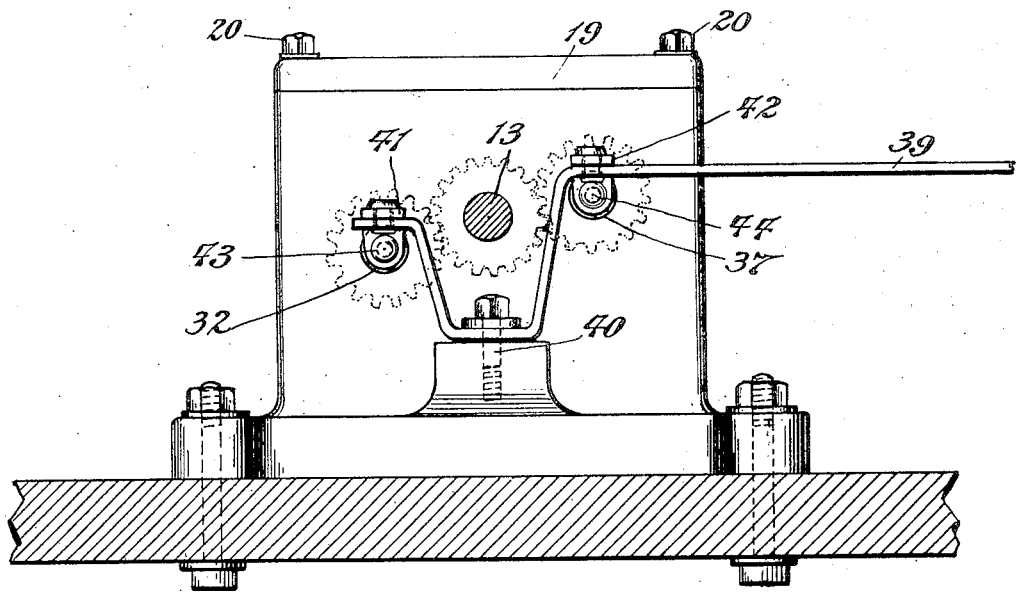
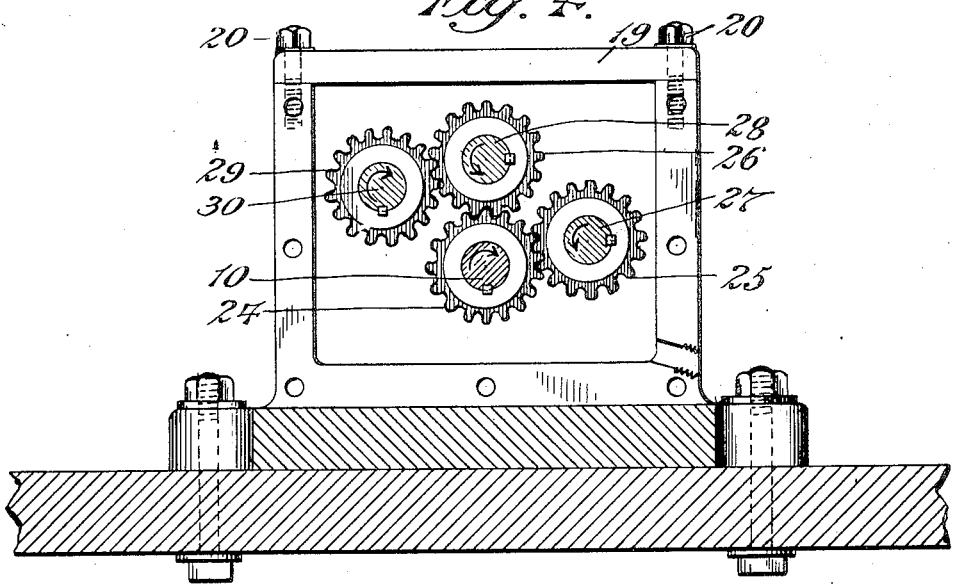

MICHAEL J. MULHALL, OF BROOKLYN, NEW YORK.

REVERSIBLE DRIVING-GEAR.

1,134,480.  Specification of Letters Patent.  Patented Apr. 6, 1915.

Application filed April 27, 1914. Serial No. 834,558.

*To all whom it may concern:*

Be it known that I, MICHAEL J. MULHALL, a citizen of the United States, residing at Brooklyn, in the State of New York, have invented certain new and useful Improvements in Reversible Driving-Gear; and I do hereby declare the following to be a full, clear, and exact description of the invention, such as will enable others skilled in the art to which it appertains to make and use the same.

The present invention relates to an improved form of transmission of a powerful, simple and reliable type, whereby a driven mechanism can be stopped or started in either direction at will from a driving mechanism in constant movement.

The device is particularly useful in automobiles or motor boats or any similar locations where immediate, direct and reliable control of the driven member is desirable.

The invention is shown in a simple form in the accompanying drawings, wherein—

Figure 1 is a top plan view of the transmission with the top plate taken off, Fig. 2 is a perspective view of the clutch used in the device shown in Fig. 1, Fig. 3 is an end elevation from the driven end of the transmission, the driving shaft and the base being in section, and Fig. 4 is a vertical sectional view on x—x in Fig. 1.

The driving shaft 10 may be driven, of course, by any motive means, such as the pulley 11 and belt 12. The driven shaft is shown at 13 and it is intended to drive a propeller 14 or to do other useful work.

Upon the base plate 15 is mounted a strong casting 16 having chambers 17 and 18 at its opposite ends for accommodating the gearing. These chambers are closed at the top by a lid or plate 19 which is bolted in place as by the bolts 20. The chamber 18 is closed by the lid-plate 21 which is fastened by the bolts 22. The driving shaft finds its bearing in the lid-plate 21 and in a suitable bearing cavity 23 in the casting 16, into which cavity the shaft 10 projects.

Within the cavity 18 the driving shaft is furnished with a spur gear 24 which is fixed thereto, which gear engages two other gears 25 and 26, mounted upon stub shafts 27 and 28 having bearings in suitable cavities in the casting 16 and cover 21. The gear 26 also meshes with a fourth gear 29 fixed to a revoluble shaft 30 which is similarly mounted. The inner ends of the intermediate stub shafts 27 and 30 are partly cut away as shown plainly in Fig. 2 at 31 to form a clutch member.

The openings in the casting 16, which accommodate the ends of the shafts 27 and 30 pass all the way through the shaft, and the opposite ends of these openings accommodate corresponding driven counter shafts 32 and 33 each of which is cut away at its end as shown for instance at 34 in Fig. 2 to form a second clutch member adapted to engage the corresponding clutch member in the stub shaft opposed to it, as also shown in Fig. 2.

The driven shaft 13 passes through the outer end of the casting and through the chamber 17, and finds its inner bearing in the main body of the casting as at 35. Fixed upon this driven shaft is a long spur gear 36 with which engage the spur gears 37 and 38 mounted respectively on the stub shafts 32 and 33. These stub shafts are adapted to slide in their bearings and the gears 37 and 38 move with them, preserving always engagement with the driven long gear 36.

Means are provided for giving simultaneous longitudinal movement of the stub shafts 32 and 33 in opposite directions, thereby bringing one of the clutch members 34 into engagement with its opposite member 31, at a time. One simple form of mechanism for this purpose is shown in Figs. 1 and 3 and comprises a suitable shaped operating lever 39 pivoted at 40 and connected by the pivoted links 41 and 42 to swivel pins 43 and 44 screwed into the extremities of the stub shafts 32 and 33. When the lever 39 is moved in one direction or the other, as indicated by the arrows in Fig. 1, one or the other of the stub shafts 32 or 33 will be brought into operative relation with its opposite stub shaft 27 or 30 as the case may be.

Upon examination of Fig. 4, it will be seen that the shafts 27 and 30 revolve in opposite directions continually. Consequently, when the stub shaft 32 is in engagement with the shaft 27, the gear 37 will drive the shaft 13 in one direction; and when the opposite engagement is made, the gear 38 will drive it in the opposite direction. When the gears are in the position shown in Fig. 1, the driven shaft will be at rest.

It is, of course, to be understood that the forms of gearing and the forms of clutches, as well as the arrangement and construction of the shifting mechanism may all be very greatly varied without departing from the invention.

What I claim is—

1. A reversible transmission gearing comprising in combination a driving member, a driven member, two intermediate shafts driven in opposite directions by the driving member, two slidable shafts geared to said driven member, and means adapted to move said slidable shafts simultaneously in opposite directions so as to produce engagement of one or the other at will with its corresponding intermediate shaft, substantially as described.

2. A reversible transmission gearing comprising in combination a driving member, a driven member, two intermediate shafts driven in opposite directions by the driving member, a long spur gear on the driven shaft, two slidable shafts each adapted to engage with a corresponding intermediate shaft, a short spur gear on each slidable shaft continually in engagement with said long gear, and means for shifting said slidable shafts in opposite directions simultaneously, substantially as described.

3. A reversible transmission gearing comprising in combination a driving member, a driven member, two intermediate shafts driven in opposite directions by the driving member, two slidable shafts geared to said driven member, both being out of engagement with their corresponding intermediate shafts when in neutral position, and means adapted to move said slidable shafts simultaneously in opposite directions so as to produce engagement of one or the other at will with its corresponding intermediate shaft, substantially as described.

4. A reversible transmission gearing comprising in combination a driving shaft, two intermediate shafts having clutch members at one end of each, gearing uniting said driving shaft with said intermediate shafts and adapted to drive the latter in opposite directions, a driven shaft, two slidable shafts having clutch members adapted to engage said first named clutch members respectively, gearing between said slidable shafts and said driven shaft and means adapted to bring either slidable shaft at will and alone into engagement with its corresponding intermediate shaft, substantially as described.

5. A reversible transmission gearing comprising in combination a casting provided with chambers at its ends and having a cover plate closing at least one of said chambers, and bearing cavities opening into said chambers; in combination with a driving shaft and intermediate shafts having bearings in the cavities at one end and passing through one of said chambers, gearing within said chamber connecting said driving shaft with said intermediate shafts for opposite revolution of the latter, a driven shaft and slidable shafts passing through the opposite chamber, gearing within said chamber connecting said last named shafts, and means for causing one of said slidable shafts at a time to engage alone with its corresponding intermediate shaft, substantially as described.

In testimony whereof, I affix my signature, in presence of two witnesses.

MICHAEL J. MULHALL.

Witnesses:
HAROLD MACKAYE,
KATHARINE C. MEAD.